United States Patent
Choi et al.

(10) Patent No.: US 7,944,879 B2
(45) Date of Patent: May 17, 2011

(54) RESOURCE ALLOCATING APPARATUS AND METHOD IN MULTIHOP RELAY WIRELESS COMMUNICATION SYSTEM

(75) Inventors: Jin-Ghoo Choi, Seoul (KR); Sang-Boh Yun, Seongnam-si (KR); Oh-Soon Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 821 days.

(21) Appl. No.: 11/865,890

(22) Filed: Oct. 2, 2007

(65) Prior Publication Data

US 2008/0081626 A1    Apr. 3, 2008

(30) Foreign Application Priority Data

Oct. 2, 2006    (KR) .................. 10-2006-0097117

(51) Int. Cl.
*H04W 4/00*    (2009.01)
*H04W 72/00*    (2009.01)
(52) U.S. Cl. ......... 370/329; 370/338; 370/341; 455/450
(58) Field of Classification Search .......... 370/328–350; 455/432.1–464
See application file for complete search history.

(56) References Cited

U.S. PATENT DOCUMENTS

| | | | |
|---|---|---|---|
| 7,817,996 B2* | 10/2010 | Brunner | 455/422.1 |
| 2006/0126553 A1* | 6/2006 | Lim et al. | 370/321 |
| 2007/0081502 A1* | 4/2007 | Lee et al. | 370/337 |
| 2007/0191015 A1* | 8/2007 | Hwang et al. | 455/442 |
| 2007/0206532 A1* | 9/2007 | Munzner | 370/329 |
| 2007/0243874 A1* | 10/2007 | Park et al. | 455/442 |
| 2008/0013606 A1* | 1/2008 | Boariu et al. | 375/211 |

FOREIGN PATENT DOCUMENTS

KR    10-2005-0114589 A    12/2005

OTHER PUBLICATIONS

IEEE Std 802.16-2004 (Revision of IEEE Std 802.16-2001), IEEE Standard for Local and Metropolitan Area Networks Part 16: Air Interface for Fixed Broadband Wireless Access Systems, Oct. 2004, IEEE, pp. 1-857.*

* cited by examiner

*Primary Examiner* — Tri H Phan
(74) *Attorney, Agent, or Firm* — Jefferson IP Law, LLP (57) ABSTRACT

An apparatus and a method for mitigating interference of a neighbor cell in a multihop relay wireless communication system are provided. The method includes constituting a subframe for a link affected by interference of a neighbor cell over a first frequency band of the frame, and constituting a subframe for a link causing interference to a neighbor cell over a second frequency band of the frame. Therefore, the interference between the neighbor cells can be reduced and the amount of the resources allocated to the links can be freely adjusted.

25 Claims, 8 Drawing Sheets

RESOURCE ALLOCATING APPARATUS AND METHOD IN MULTIHOP RELAY WIRELESS COMMUNICATION SYSTEM

PRIORITY

This application claims the benefit under 35 U.S.C. §119 (a) of a Korean patent application filed in the Korean Intellectual Property Office on Oct. 2, 2006 and assigned Serial No. 2006-97117, the entire disclosure of which is hereby incorporated by reference.

BACKGROUND OF THE INVENTION

1. Field of the Invention

The present invention relates generally to a multihop relay wireless communication system. More particularly, the present invention relates to an apparatus and method for reducing interference of a neighbor cell in the multihop relay wireless communication system.

2. Description of the Related Art

When adopting a Time Division Duplex (TDD) scheme, a wireless communication system communicates data by dividing a frame consisting of one frequency band into a transmit interval and a reception interval using time resources. The wireless communication system can adjust an amount of resources allocated to UpLink (UL)/DownLink (DL) according to a traffic volume. That is, the wireless communication system can adjust a size of the transmission interval and the reception interval based on the traffic volume.

Accordingly, when a TDD based wireless communication system consists of multiple cells, each cell of the wireless communication system can allocate different resources to the UL/DL according to the traffic volume. In this case, the wireless communication system may suffer interference of a neighbor cell because the UL/DL timing of the neighbor cells does not match as shown in FIG. 1.

Figure 1:
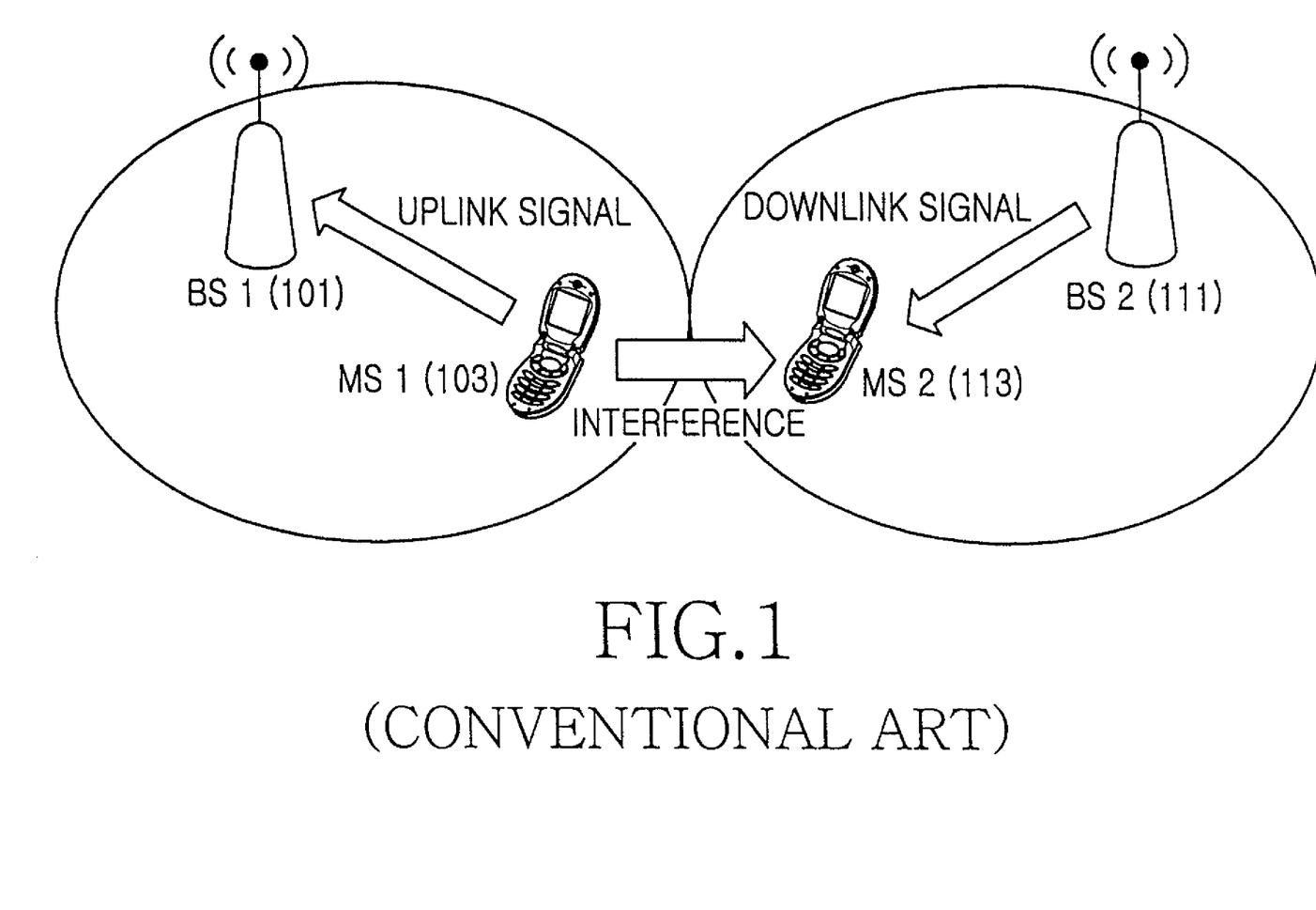
FIG. 1 illustrates a construction of a conventional TDD system.

FIG. 1 illustrates a construction of a conventional TDD system.

In FIG. 1, a first Base Station (BS) 101 communicates with a first Mobile Station (MS) 103, and a second BS 111 communicates with a second MS 113. The first BS 101 and the second BS 111 communicate with the MSs 103 and 113, respectively, using the TDD scheme. Thus, the first BS 101 and the second BS 111 can allocate different amounts of resource to the UL/DL according to the traffic volume with the MSs 103 and 113.

When the BSs 101 and 111 allocate different amounts of resource to the UL/DL, an interference of a neighbor cell can be caused because UL/DL timings for the BSs 101 and 111 do not match. For instance, when the first BS 101 sends a DL signal to the first MS 103 and the second MS 113 sends a UL signal to the second BS 111, the UL signal of the second MS 113 acts as considerable interference to the DL signal received at the first MS 103. As a result, the first MS 103 is subject to reception performance deterioration due to the interference of the second MS 113.

As discussed above, when the amounts of the UL/DL resource are different in the neighbor cells in the TDD wireless communication system, the MS in the cell boundary is subject to the deterioration of the reception performance because of the interference of the neighbor cell.

A recent wireless communication system provides a relay service using a Relay Station (RS) to expand a service coverage area without a shadow area or to increase a transmission speed of an MS in the cell boundary.

When the wireless communication system provides the relay service, and the timings of the UL/DL of a BS do not match with a neighbor BS, an RS or an MS in the cell boundary may suffer the deterioration of the reception performance because of the interference of the neighbor cell.

SUMMARY OF THE INVENTION

An aspect of the present invention is to address at least the above-mentioned problems and/or disadvantages and to provide at least the advantages described below. Accordingly, an aspect of the present invention is to provide a resource allocating apparatus and method for mitigating interference between neighbor cells in a multihop relay wireless communication system.

Another aspect of the present invention is to provide an apparatus and method for mitigating interference between neighbor cells using a hybrid duplex scheme in a multihop relay wireless communication system.

Yet another aspect of the present invention is to provide an apparatus and method for mitigating interference of a neighbor cell by allocating a link causing strong interference to a neighbor cell and a link vulnerable to interference of the neighbor cell to different frequency bands in a multihop relay wireless communication system.

The above aspects are achieved by providing a frame constituting method of a wireless communication system. The method includes constituting a subframe for a link affected by interference of a neighbor cell over a first frequency band of the frame, and constituting a subframe for a link causing interference to a neighbor cell over a second frequency band of the frame.

According to the aspect of the present invention, a resource allocating method of a Base Station (BS) in a wireless communication system is provided. The method includes confirming a distance of a Relay Station (RS) or Mobile Stations (MSs) using position information of the RS or the MSs, dividing into a link affected by interference of a neighbor cell and a link causing interference to a neighbor cell according to the distance of the RS and the MSs, allocating the link affected by the interference of the neighbor cell and the link causing the interference to the neighbor cell to different frequency bands, and communicating with the RS or the MS according to the allocated resource information.

According to another aspect of the present invention, a communicating method of an RS in a wireless communication system is provided. The method includes confirming and sending position information to a serving BS, when resource allocation information is received from the serving BS, confirming a frequency resource allocated to a link to the BS or an MS based on the resource allocation information, and communicating with the BS or the MS such that a link affected by interference of a neighbor cell uses a first frequency band and a link causing interference to the neighbor cell uses a second frequency band according to the allocated frequency resource.

According to yet another aspect of the present invention, a communicating method of an MS in a wireless communication system is provided. The method includes confirming and sending position information to a BS, when resource allocation information is received from the BS, confirming a frequency resource allocated to a link to the BS or an RS based on the resource allocation information, and communicating with the BS or the RS such that a link affected by interference of a neighbor cell uses a first frequency band and a link causing interference to the neighbor cell uses a second frequency band according to the allocated frequency resource.

According to still another aspect of the present invention, a BS in a wireless communication system is provided. The BS includes a receiver for receiving position information from an RS or MSs, a position information confirmer for confirming a distance to the RS or the MSs based on the received position information, and a resource allocator for allocating a link affected by interference of a neighbor cell and a link causing interference to the neighbor cell to different frequency bands according to the distance information.

According to a further aspect of the present invention, an RS in a wireless communication system is provided. The RS includes a receiver for receiving resource allocation information from a BS, and for receiving a signal from the BS or a MS under control of a controller, the controller for controlling to communicate with the BS or the MS such that a link affected by interference of a neighbor cell uses a first frequency band and a link causing interference to the neighbor cell uses a second frequency band according to the resource allocation information, and a sender for transmitting a signal to the BS or the MS under the control of the controller.

According to a further aspect of the present invention, a MS in a wireless communication system is provided. The MS includes a receiver for receiving resource allocation information from a BS, and for receiving a signal from the BS or a RS under control of a controller, the controller for controlling to communicate with the BS or the RS such that a link affected by interference of a neighbor cell uses a first frequency band and a link causing interference to the neighbor cell uses a second frequency band according to the resource allocation information, and a sender for transmitting a signal to the BS or the RS under the control of the controller.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a technique for mitigating interference of a neighbor cell using a hybrid duplex scheme in a multihop relay wireless communication system. In the multihop relay wireless communication system, the interference between the neighbor cells is reduced by allocating different frequency bands to a link causing strong interference to the neighbor cell and a link interfered by the neighbor cell. The link causing the strong interference to the neighbor cell indicates a link which transfers a signal from a node (Mobile Station (MS) or Relay Station (RS)) in a cell boundary to a node (Base Station (BS) or RS) in the center of the cell. The link interfered by the neighbor cell indicates a link which transfers a signal from a node in the center of the cell to a node in the cell boundary.

Figure 3:
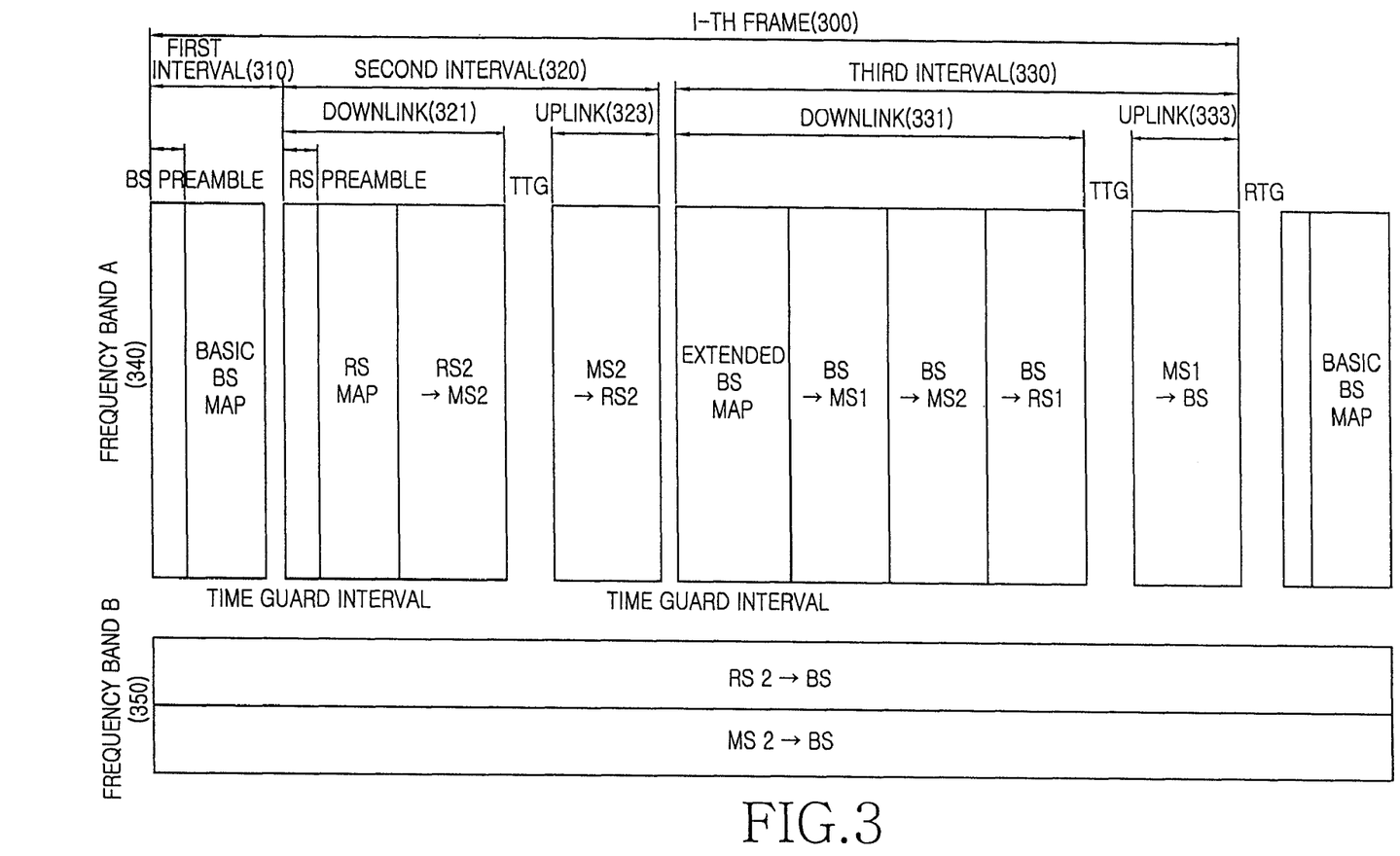
FIG. 3 illustrates a frame structure of a multihop relay hybrid duplex system according to an exemplary embodiment of the present invention.
Figure 4:
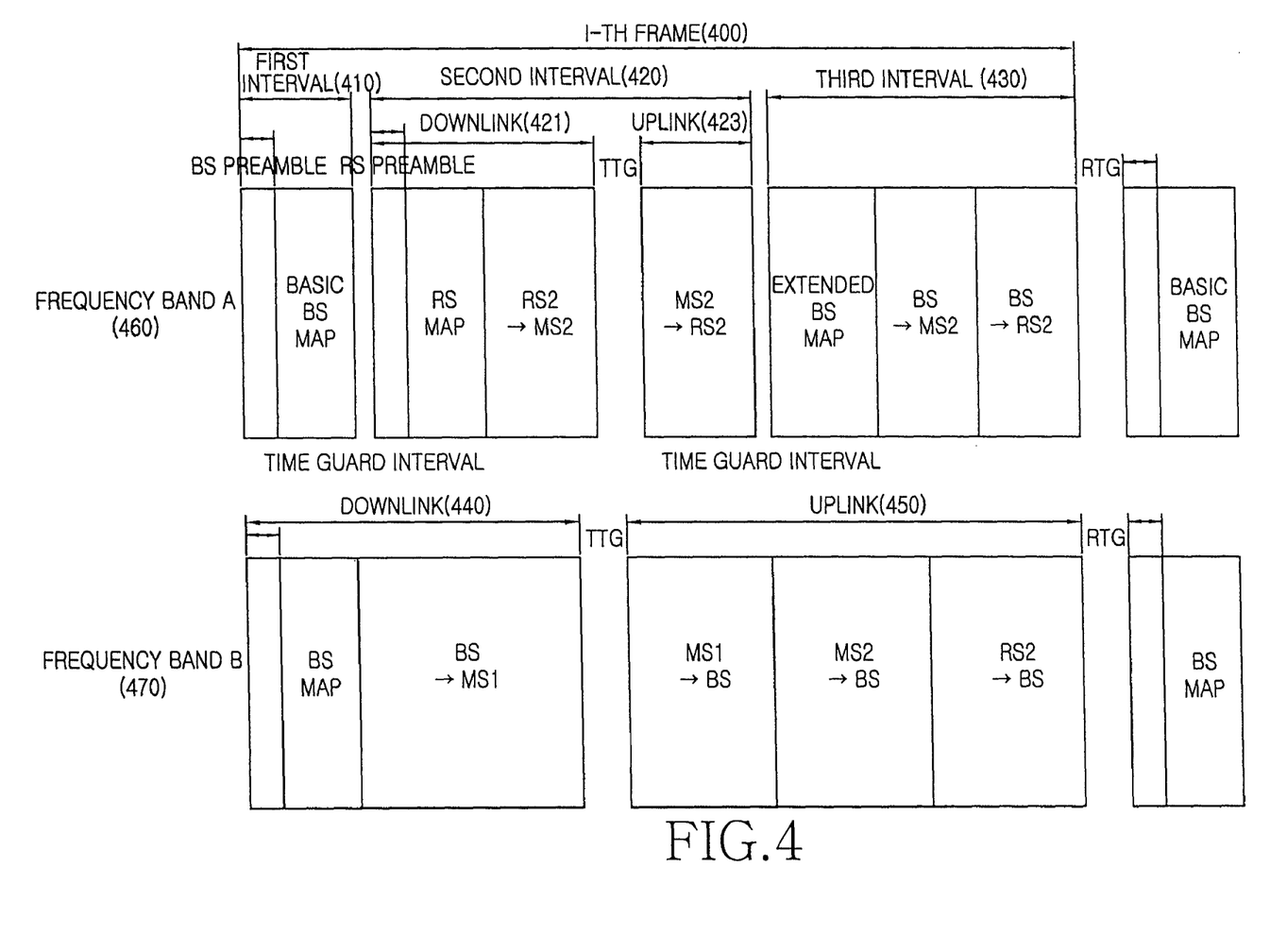
FIG. 4 illustrates a frame structure of a multihop relay hybrid duplex system according to an exemplary embodiment of the present invention.

The hybrid duplex scheme, which combines a Frequency Division Duplex (FDD) scheme and a Time Division Duplex (TDD) scheme, can constitute a frame as shown in FIG. 3 or FIG. 4. Accordingly, the hybrid duplex scheme has all the advantages of the FDD scheme and the TDD scheme. Since the hybrid duplex scheme can service a user traveling fast in a wide region and transceive signals correctly, the advantages of the FDD scheme suitable for the voice service can be achieved. Since the hybrid duplex scheme can service a user traveling slowly in a small region and acquire a high transmission rate with less inter-cell interference, the advantages of the TDD scheme suitable for the data service can be achieved.

Figure 2:
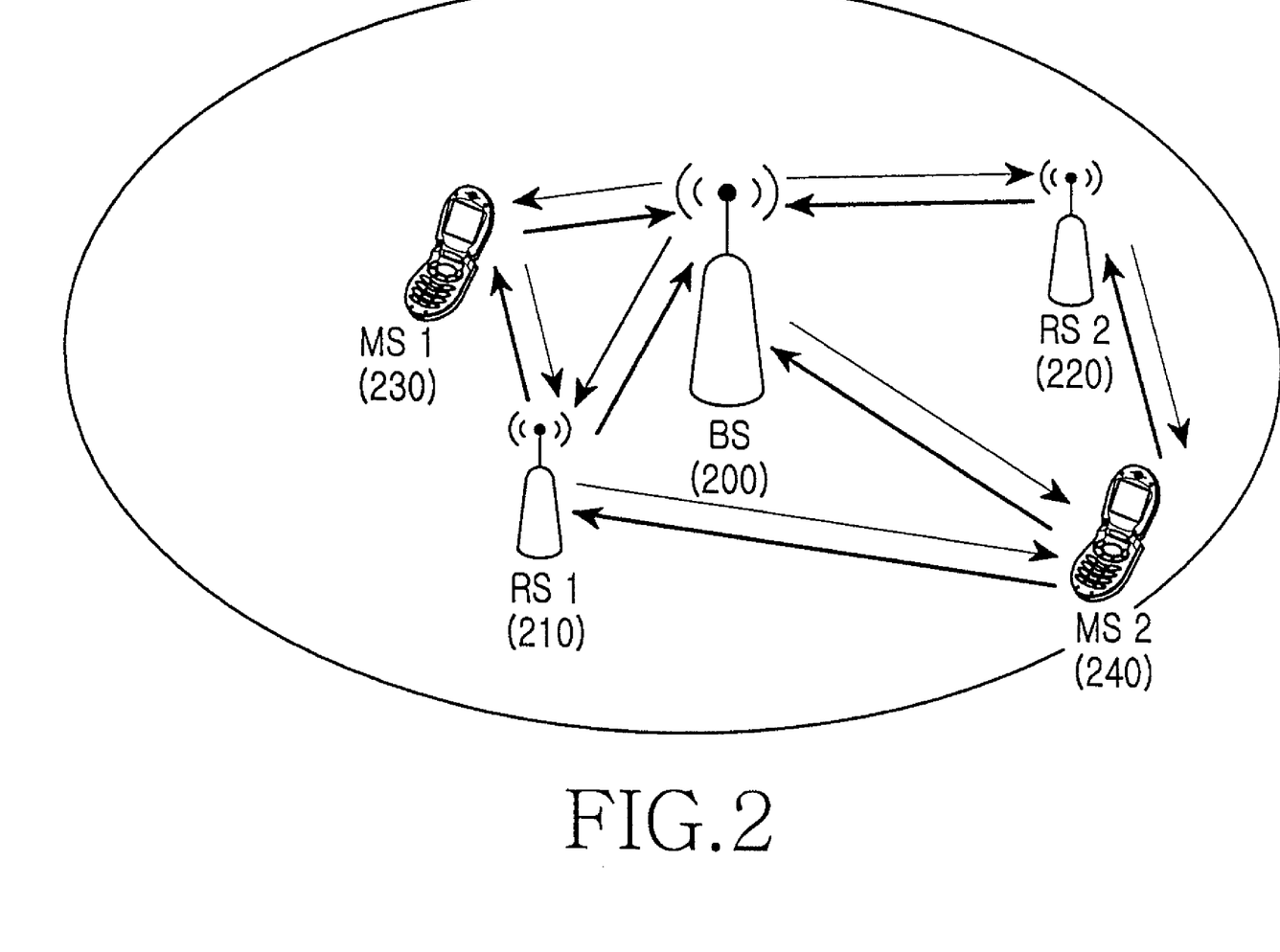
FIG. 2 illustrates a construction of a multihop relay wireless communication system according to an exemplary embodiment of the present invention.

Now, a technique for mitigating interference of a neighbor cell in a multihop relay wireless communication system as shown in FIG. 2 is described.

FIG. 2 illustrates a construction of a multihop relay wireless communication system according to an exemplary embodiment of the present invention.

Referring to FIG. 2, MSs 230 and 240 are serviced through a BS 200 or RSs 210 and 220. In other words, the BS 200 communicates with the MSs 230 and 240 in its service coverage area using direct links.

An MS, which travels in a shadow area like the first MS 230 or in a boundary of the service coverage area, communicates with the BS 200 via the first RS 210. The first RS 210 relays the communications between the BS 200 and the MS to raise the transmission capacity of the MS.

An MS, which travels outside the service coverage area of the BS 200 like the second MS 240 or in the cell boundary, communicates with the BS 200 via the second RS 220. The second RS 220 expands the service coverage area of the BS 200 by relaying the communications between the BS 200 and the MS.

In the wireless communication system constructed as above, provided that the first RS 210 and the first MS 230 are positioned in the center of the cell and that the second RS 220 and the second MS 240 are positioned in the cell boundary, an uplink from the second RS 220 to the BS 200, an uplink from the second MS 240 to the BS 200, and an uplink from the second MS 240 to the first RS 210 cause strong interference to a neighbor cell. By contrast, a downlink from the BS 200 to the second RS 220, a downlink from the BS 200 to the second MS 240, a downlink from the first RS 210 to the second MS 240, and uplink/downlink between the second RS 220 and the second MS 240 are strongly interfered by the neighbor cell.

To mitigate the interference between the neighbor cells, the wireless communication system allocates the link causing the strong interference to the neighbor cell and the link affected by the strong interference from the neighbor cell to different frequency bands. A frame constituted to allocate the link causing the strong interference to the neighbor cell and the link affected by the strong interference from the neighbor cell to the different frequency bands can vary system by system. Once the frame structure is defined in the wireless communication system, the frame structure cannot be modified in the process of the system operation. Yet, the resource allocation of sub-frames constituting the frame can be adjusted in real time selectively within the frame structure according to the network load and the traffic characteristic.

Now, descriptions are made of the providing of the frame structure to allocate the link causing the strong interference to the neighbor cell and the link affected by the strong interference from the neighbor cell to the different frequency bands to reduce the interference between the neighbor cells in the wireless communication system. It is assumed that the frame structure uses only the second RS 220 in the wireless communication system of FIG. 2. It is also assumed that the first MS 230 travels in the center of the cell and that the second RS 220 and the second MS 240 are positioned in the cell boundary in FIG. 2.

FIG. 3 illustrates a frame structure of a multihop relay hybrid duplex system according to an exemplary embodiment of the present invention.

Referring to FIG. 3, an $i^{th}$ frame 300 includes a frame 340 of a frequency band A and a frame 350 of a frequency band B. The frame 340 of the frequency band A includes a subframe for a link not interfered by the neighbor cell and subframes for links greatly interfered by the neighbor cell as time resources. The frame 350 of the frequency band B includes subframes for links which cause the strong interference to the neighbor cell as frequency resources. The subframe for the link not affected by the interference of the neighbor cell includes a subframe for the link between the BS 200 and the first MS 230. The subframes for the links affected by the strong interference of the neighbor cell include a subframe for the downlink between the BS 200 and the second RS 220, a subframe for the downlink between the BS 200 and the second MS 240, and a subframe for the link between the second RS 220 and the second MS 240. The subframes for the link causing the strong interference to the neighbor cell include a subframe for the uplink between the second RS 220 and the BS 200 and a subframe for the uplink between the second MS 240 and the BS 200. The frame 340 of the frequency band A and the frame 350 of the frequency band B have the same start point and the same length.

The frame 340 of the frequency band A is divided to a first interval 310 for control information, a second interval 320 for the relay link, and a third interval 330 for the direction link as the time resources. A time guard interval is inserted between the first interval 310, the second interval 320, and the third interval 330.

The first interval 310 includes a BS preamble which is a sync channel for the synchronization with the second RS 220 and the MSs, and BS MAP information including resource allocation information. The BS MAP information includes the resource allocation information relating to a second interval of a $(i+1)^{th}$ frame.

The second interval 320 is divided into a downlink subframe 321 and an uplink subframe 323. The downlink subframe 321 includes an RS preamble which is a sync channel for the synchronization with the second MS 240, an RS MAP including resource allocation information of the second interval 320, and a downlink burst sent from the second RS 220 to the second MS 240.

The uplink subframe 323 includes an uplink burst sent from the second MS 240 to the second RS 220.

The third interval 330 is divided to a downlink subframe 331 and an uplink subframe 333. The downlink subframe 331 includes extended BS MAP information not transmitted in the BS MAP interval, and downlink bursts sent from the BS 200 to the first MS 230, the second MS 240, and the second RS 220.

The uplink subframe 333 includes an uplink burst sent from the first MS 230 to the BS 200.

In the frame 340 of the frequency band A, a time guard interval of Transmit/Receive Transition Gap (TTG) is inserted between the downlink subframe and the uplink subframe. Also, a time guard interval of Receive/Transmit Transition Gap (RTG) is inserted between the frames.

The frame 350 of the frequency band B includes subframes for the links causing the strong interference to the neighbor cell as frequency resources. The subframes for the links causing the strong interference to the neighbor cell include a subframe for the uplink between the second RS 220 and the BS 200 and a subframe for the uplink between the second MS 240 and the BS 200.

FIG. 4 illustrates a frame structure of a multihop relay hybrid duplex system according to an exemplary embodiment of the present invention.

Referring to FIG. 4, an $i^{th}$ frame 400 is divided to a frame 460 of a frequency band A and a frame 470 of a frequency band B. The frame 460 of the frequency band A is segmented into subframes for the links affected by the strong interference of the neighbor cell as time resources. The frame 470 of the frequency band B is segmented into a subframe for the link not affected by the interference of the neighbor cell, and subframes for the links causing the strong interference to the neighbor cell as time resources. The subframe for the link not affected by the interference of the neighbor cell includes a subframe for the link between the BS 200 and the first MS 230. The subframes for the links affected by the strong interference of the neighbor cell include a subframe for the downlink between the BS 200 and the second RS 220, a subframe for the downlink between the BS 200 and the second MS 240, and a subframe for the link between the second RS 220 and the second MS 240. The subframes for the links causing the strong interference to the neighbor cell include a subframe for the uplink between the second RS 220 and the BS 200 and a subframe for the uplink between the second MS 240 and the BS 200. The frame 460 of the frequency band A and the frame 470 of the frequency band B have the same start point and the same length.

The frame 460 of the frequency band A is time-divided into a first interval 410 for the control information, a second interval 420 for the relay link, and a third interval 430 for the direct link. A time guard interval is inserted between the first interval 410, the second interval 420, and the third interval 430.

The first interval 410 includes a BS preamble which is a sync channel for the synchronization of the second RS 220 and the second MS 240, and BS MAP information including resource allocation information. The BS MAP information includes the resource allocation information relating to a second interval of a $(i+1)^{th}$ frame.

The second interval 420 is divided into a downlink subframe 421 and an uplink subframe 423. The downlink subframe 421 includes an RS preamble which is a sync channel for the synchronization of the second MS 240, RS MAP information including resource allocation information of the second interval 420, and a downlink burst sent from the second RS 220 to the second MS 240.

The uplink subframe 423 includes an uplink burst sent from the second MS 240 to the second RS 220.

The third interval 430 includes extended BS MAP information not sent in the BS MAP interval, and a downlink burst sent from the BS 200 to the second MS 240 or the second RS 220.

The frame 470 of the frequency band B is divided into a downlink subframe 440 and an uplink subframe 450.

The downlink subframe 440 includes a BS preamble which is a sync channel for the synchronization of the first MS 230, BS MAP information including resource allocation information, and a downlink burst sent from the BS 200 to the first MS 230.

The uplink subframe 450 includes uplink bursts sent from the first MS 230, the second MS 240, and the second RS 220 to the BS 200.

A time guard interval of TTG is inserted between the downlink subframe 440 and the uplink frame 450 of the frame 470. A time guard interval of RTG is inserted between the frames.

As indicated above, to mitigate the interference between the neighbor cells, the wireless communication system allocates the link causing the strong interference to the neighbor cell and the link affected by the strong interference of the neighbor cell to the different frequency bands. If the BS of the wireless communication system allocates the resources, it needs to recognize the position information of the RS and the MS.

Hence, a method for the BS to acquire the position information of the RS and the MS and to allocate the resources and a method for the RS and the MS to send their position information to the BS are now explained. Since the RS and the MS operate the same, the operation of the RS is only illustrated by way of example.

Figure 5:
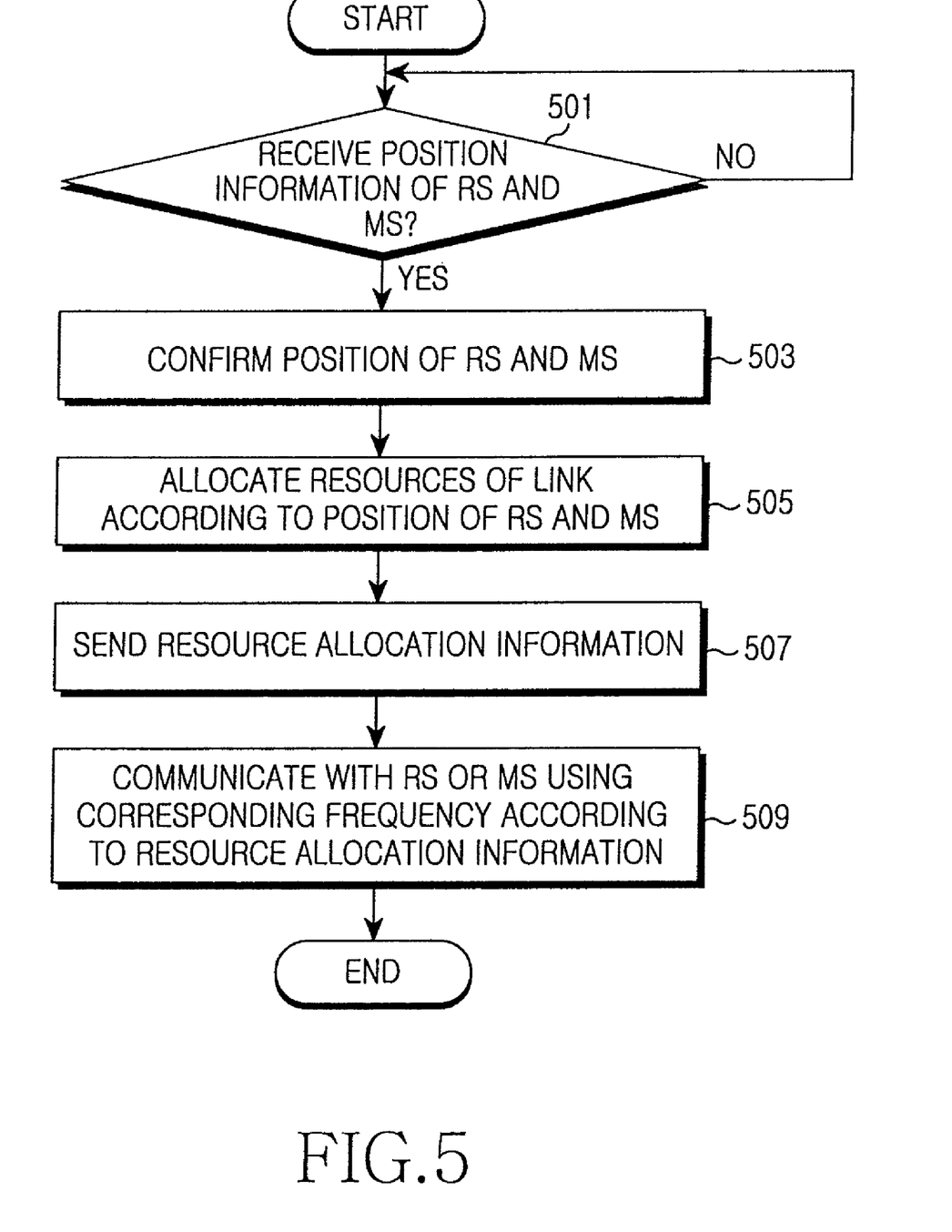
FIG. 5 illustrates operations of a Base Station (BS) in a multihop relay hybrid duplex system according to an exemplary embodiment of the present invention.

FIG. 5 illustrates operations of the BS in a multihop relay hybrid duplex system according to an exemplary embodiment of the present invention.

Referring to FIG. 5, the BS examines whether position information is received from the RS and the MS in step 501.

When receiving the position information, the BS confirms the positions of the RS and the MS using the received position information in step 503. Herein, the position information of the RS and the MS indicates a distance from the BS positioned in the center of the cell to the RS or the MS. For example, when the RS and the MS transmit Global Positioning System (GPS) coordinate information, the BS can acquire the distance to the RS or the MS using the GPS coordinates. If the RS and the MS transmit receive signal strength information or Signal to Interference and Noise Ratio (SINR) information, the BS can calculate the distance to the RS or the MS using the receive signal strength or the SINR.

After confirming the position information of the RS and the MS, the BS allocates frequency resources according to the position information of the RS and the MS in step 505. For example, the BS distinguishes a link affected by the strong interference of the neighbor cell and a link causing the strong interference to the neighbor cell according to the position information of the RS and the MS. Next, the BS allocates different frequency bands to the link affected by the strong interference of the neighbor cell and the link causing the strong interference to the neighbor cell.

In step 507, the BS transmits the resource allocation information to the RS and the MS. That is, the BS sends MAP including the resource allocation information to the RS and the MS.

After sending the resource allocation information, the BS communicates with the RS or the MS according to the resource allocation information in step 509.

Next, the BS finishes this process.

Figure 6:
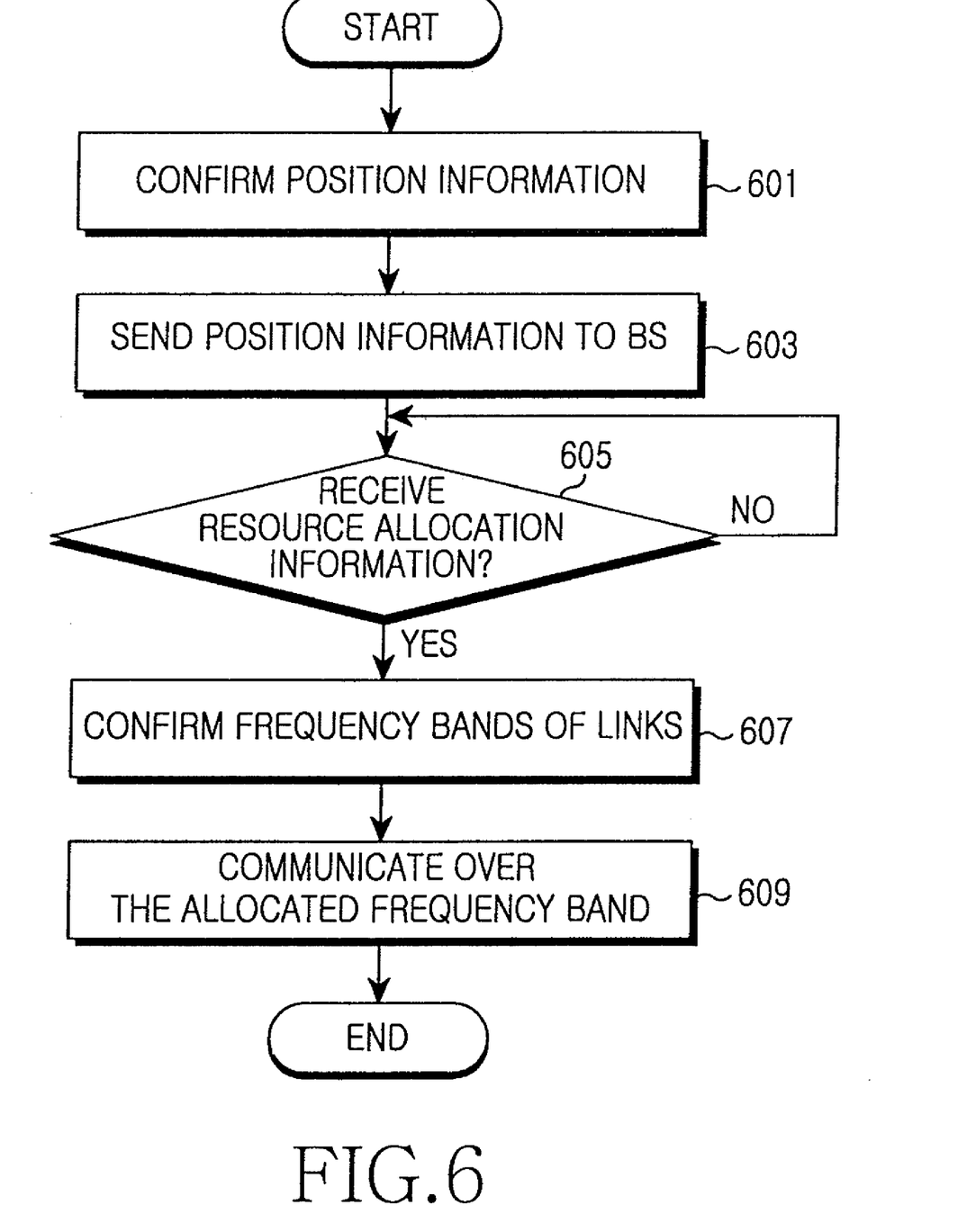
FIG. 6 illustrates operations of a Relay Station (RS) in a multihop relay hybrid duplex system according to an exemplary embodiment of the present invention.

FIG. 6 illustrates operations of an RS in a multihop relay hybrid duplex system according to an exemplary embodiment of the present invention.

Referring to FIG. 6, the RS confirms its position information in step 601. The position information indicates a distance to the BS positioned in the center of the cell. For instance, when the RS includes a GPS module, it acquires coordinate information of the current position from a satellite. The RS also measures the strength or the SINR of the signal received from the BS.

After confirming the position information, the RS sends the confirmed position information to the BS in step 603.

In step 605, the RS examines whether resource allocation information is received from the BS.

Upon receiving the resource allocation information, the RS confirms a frequency band allocated by the BS from the resource allocation information in step 607.

After confirming the frequency band, the RS communicates with the BS or the MS over the allocated frequency band in step 609.

Next, the RS finishes this process.

Hereafter, descriptions explain the BS for acquiring the position information of the RS and the MS and allocating the resources, and the RS for communicating using the resource allocation information from the BS in the wireless communication system. Since the RS and the MS operate the same, only the RS is illustrated by way of example.

Figure 7:
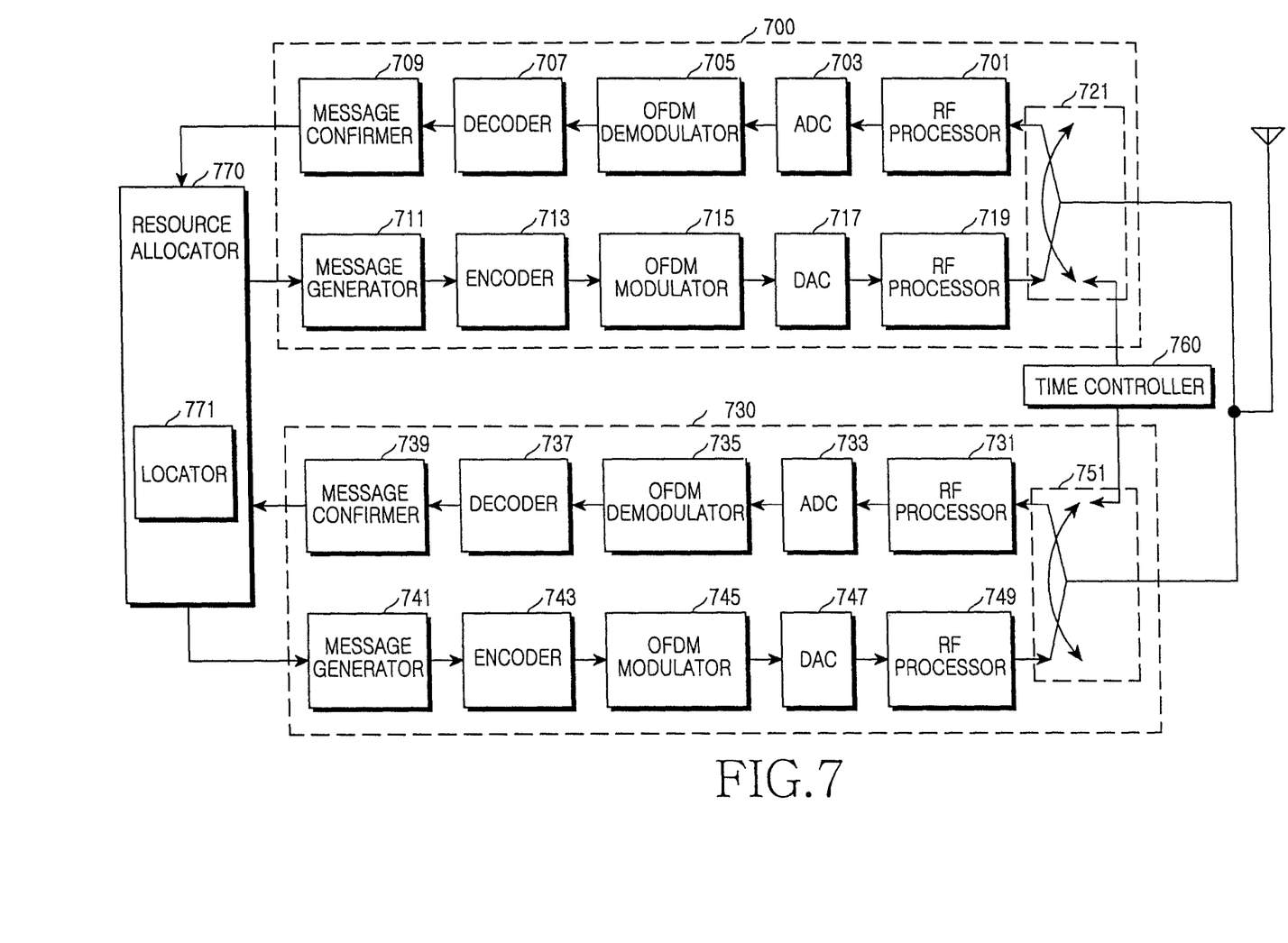
FIG. 7 is a block diagram of a BS in a multihop relay hybrid duplex system according to an exemplary embodiment of the present invention.

FIG. 7 is a block diagram of a BS in a multihop relay hybrid duplex system according to an exemplary embodiment of the present invention.

Referring to FIG. 7, the BS includes a first transceiver 700 for the communications over the frequency band A, a second transceiver 730 for the communications over the frequency band B, a time controller 760, and a resource allocator 770. Since the first transceiver 700 and the second transceiver 730 operate the same except for the different frequency bands, the second transceiver 730 shall not be described in detail.

The time controller 760 controls a switching operation of switches 721 and 751 based on the frame synchronization. For example, in the signal reception interval, the time controller 760 controls the switches 721 and 751 to connect an antenna to Radio Frequency (RF) processors 701 and 731 of the receiving end. In the signal transmission interval, the time controller 760 controls the switches 721 and 751 to connect the antenna to RF processors 719 and 749 of the transmitting end.

The first transceiver 700 includes the RF processor 701, an Analog/Digital Converter (ADC) 703, an Orthogonal Frequency Division Multiplexing (OFDM) demodulator 705, a decoder 707, a message confirmer 709, a message generator 711, an encoder 713, an OFDM modulator 715, a DAC 717, the RF processor 719, and the switch 721.

In the reception interval, the RF processor 701 down-converts an RF signal received on the antenna to a baseband signal. The ADC 703 converts the analog signal fed from the RF processor 701 to sample data. The OFDM demodulator 705 converts the time-domain sample data fed from the ADC 703 to frequency-domain data using a Fast Fourier Transform (FFT).

The decoder 707 selects data of subcarriers to actually receive from the frequency-domain data fed from the OFDM demodulator 705. Next, the decoder 707 demodulates and decodes the selected data according to a preset modulation level (Modulation and Coding Scheme (MCS) level).

The message confirmer 709 decomposes a control message provided from the decoder 707 and provides the result to the resource allocator 770. For example, the message confirmer 709 confirms position information received from the RS and the MS and provides the confirmed position information to the resource allocator 770.

The message generator 711 generates a message with information provided from the resource allocator 770 and outputs the generated message to the encoder 713 of the physical layer. For example, the message generator 711 generates a resource allocation message for the link of the RS or the MS using the resource allocation information fed from the resource allocator 770.

The encoder 713 encodes and modulates the data fed from the message generator 711 according to the preset modulation level (MCS level). The OFDM modulator 715 converts the data fed from the encoder 713 to sample data (OFDM symbols) using an Inverse Fast Fourier Transform (IFFT). The DAC 717 converts the sample data fed from the OFDM modulator 715 to an analog signal. The RF processor 719 converts the baseband signal provided from the DAC 717 to an RF signal and transmits the RF signal over the antenna.

The resource allocator 770 measures a distance to the RS or the MS based on the position information of the RS or the MS provided from the message confirmers 709 and 739 using a locator 771. Next, the resource allocator 770 confirms a link affected by the strong interference of the neighbor cell and a link causing the strong interference to the neighbor cell based on the distance information of the RS or the MS.

The resource allocator 770 allocates different frequency bands to the link affected by the strong interference of the neighbor cell and the link causing the strong interference to the neighbor cell. In doing so, the resource allocator 770 sends the resource allocation information to the message generator 711 and a message generator 741.

Figure 8:
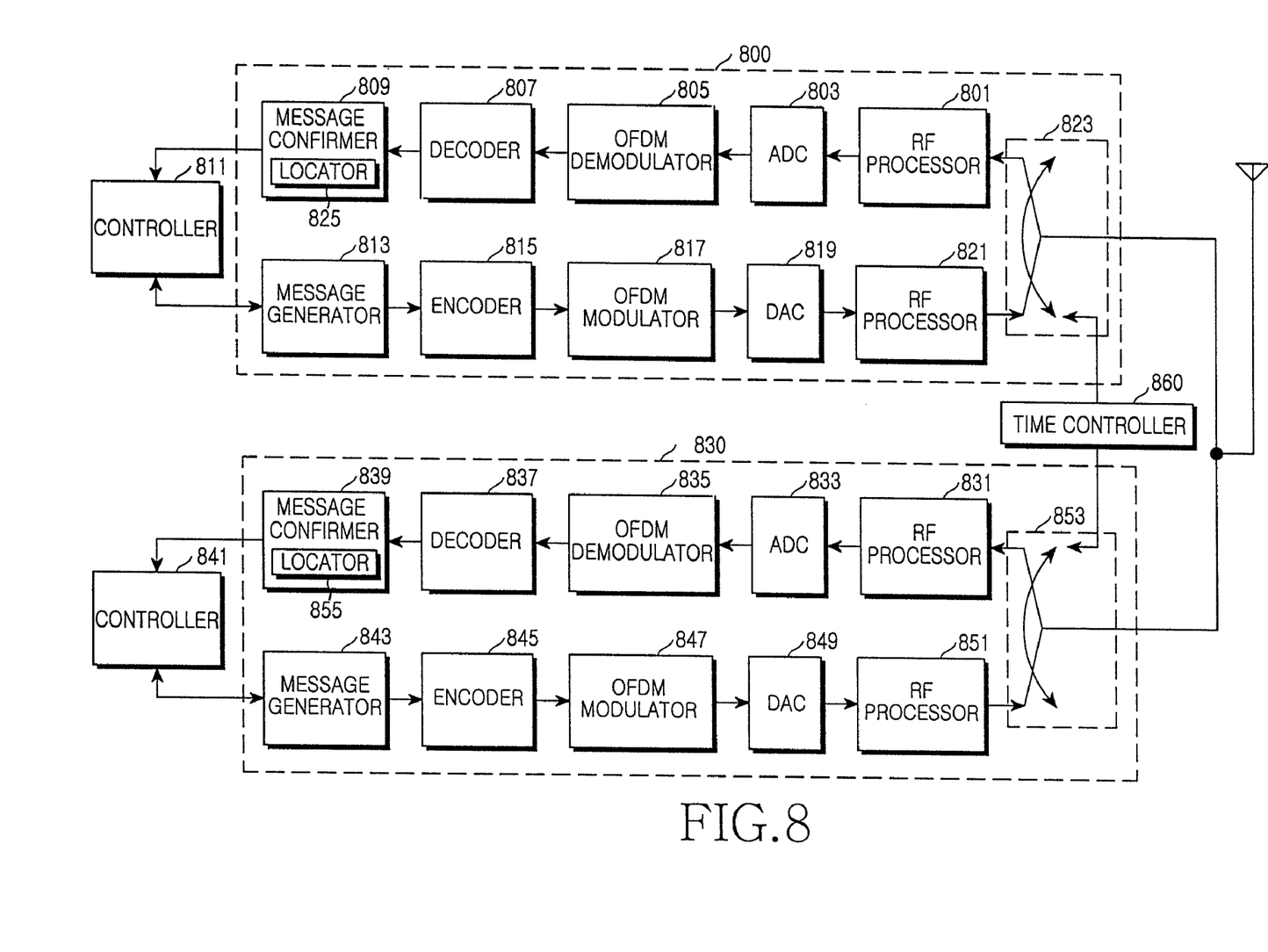
FIG. 8 is a block diagram of a RS in a multihop relay hybrid duplex system according to an exemplary embodiment of the present invention.

FIG. 8 is a block diagram of an RS in a multihop relay hybrid duplex system according to an exemplary embodiment of the present invention.

Referring to FIG. 8, the RS includes a first transceiver 800 for the communications over the frequency band A, a second transceiver 830 for the communications over the frequency band B, and a time controller 860. Since the first transceiver 800 and the second transceiver 830 operate the same except for the different frequency bands, the second transceiver 830 shall not be described in detail.

The time controller 860 controls a switching operation of switches 823 and 853 based on the frame synchronization. For example, in the signal reception interval, the time controller 860 controls the switches 823 and 853 to connect an antenna to RF processors 801 and 831 of the receiving end. In the signal transmission interval, the time controller 860 controls the switches 823 and 853 to connect the antenna to RF processors 821 and 851 of the transmitting end.

The first transceiver 800 includes the RF processor 801, an ADC 803, an OFDM demodulator 805, a decoder 807, a message confirmer 809, a controller 811, a message generator 813, an encoder 815, an OFDM modulator 817, a DAC 819, the RF processor 821, and the switch 823.

In the reception interval, the RF processor 801 down-converts an RF signal received on the antenna to a baseband signal. The ADC 803 converts the analog signal fed from the RF processor 801 to sample data. The OFDM demodulator 805 converts the sample data fed from the ADC 803 to frequency-domain data using the FFT.

The decoder 807 selects data of subcarriers to actually receive from the frequency-domain data fed from the OFDM demodulator 805. Next, the decoder 807 demodulates and decodes the selected data according to a preset modulation level (MCS level).

The message confirmer 809 decomposes a control message provided from the decoder 807 and provides the result to the controller 811. For example, when receiving resource allocation information from the BS, the message confirmer 809 confirms position information of a link to be used by the RS and provides the confirmed position information to the controller 811.

The message confirmer 809 can include a locator 825 to confirm the position. For example, when the RS includes a GPS module, the locator 825 locates the RS using a GPS coordinate signal received from a satellite. The locator 825 may measure and use strength or a SINR of the signal received from the BS as the position information.

The controller 811 performs a corresponding process with respect to information provided from the message confirmer 809, and provides the processing result to the message generator 813. In detail, the controller 811 controls the transmission and the reception of the corresponding link according to the resource allocation information fed from the message confirmer 809.

The message generator 813 generates a message with information provided from the controller 811 and outputs the generated message to the encoder 815 of the physical layer. For example, the message generator 813 generates a message to be sent to the BS with the position information from the controller 811. Also, the message generator 813 generates a message to communicate with the MS or the BS according to the resource allocation information provided from the controller 811.

The encoder 815 encodes and modulates the data fed from the message generator 813 according to the preset modulation level (MCS level). The OFDM modulator 817 converts the frequency-domain data fed from the encoder 815 to sample data (OFDM symbols) using the IFFT. The DAC 819 converts the sample data fed from the OFDM modulator 817 to an analog signal. The RF processor 821 converts the baseband signal provided from the DAC 819 to an RF signal and transmits the RF signal over the antenna.

As indicated above, the RS confirms its location using the message confirmer 809. Alternatively, the RS may locate its position using the controller 811.

In light of the foregoing, the multihop relay wireless communication system using the hybrid duplex scheme allocates different frequency resources to the link affected by the strong interference of the neighbor cell and the link causing the strong interference to the neighbor cell. Therefore, the interference between the neighbor cells can be reduced and the amount of the resources allocated to the links can be adjusted.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A frame constituting method of a wireless communication system, the method comprising:

constituting, by a Base Station (BS), a subframe for a link affected by interference of a neighbor cell over a first frequency band of a frame; and constituting, by a Base Station (BS), a subframe for a link causing interference to a neighbor cell over a second frequency band of the frame.

2. The frame constituting method of claim 1, wherein the link affected by the interference of the neighbor cell comprises a link for sending a signal from a node positioned in a center of the cell to a node positioned in a cell boundary.

3. The frame constituting method of claim 1, wherein the link affected by the interference of the neighbor cell comprises at least one of a downlink between a first Relay Station (RS) in a center of the cell and a first Mobile Station (MS) in a cell boundary, a downlink between a Base Station (BS) and a second RS in a cell boundary, and a downlink between the BS and the first MS.

4. The frame constituting method of claim 1, wherein the link causing the interference to the neighbor cell comprises a link for sending a signal from a node positioned in a cell boundary to a node positioned in a center of the cell.

5. The frame constituting method of claim 1, wherein the link causing the interference to the neighbor cell comprises at least one of an uplink between a first MS in a cell boundary and a first RS in a center of the cell, an uplink between a second RS in a cell boundary and a BS, and an uplink between the first MS and the BS.

6. The frame constituting method of claim 1, wherein the first frequency band and the second frequency band distinguish the subframes for the links with at least one of time resources and frequency resources.

7. The frame constituting method of claim 1, wherein the link affected by the interference of the neighbor cell and the link causing the interference to the neighbor cell are determined by using position information of the nodes.

8. The frame constituting method of claim 7, wherein the position information is confirmed by using at least one of Global Positioning System (GPS) coordinates of the nodes, a strength of a receive signal, and a Signal to Interference and Noise Ratio (SINR).

9. The frame constituting method of claim 1, further comprising:
constituting a subframe for a link not affected by the interference of the neighbor cell over at least one of the first frequency band and the second frequency band of the frame.

10. The frame constituting method of claim 9, wherein the link not affected by the interference of the neighbor cell comprises a link between nodes positioned in a center of the cell.

11. The frame constituting method of claim 9, wherein the link not affected by the interference of the neighbor cell comprises at least one of
an uplink/downlink between a BS and a first MS positioned in a center of a cell,
an uplink/downlink between the BS and a first RS positioned in a center of the cell, and
an uplink/downlink between the first RS and the first MS.

12. A resource allocating method of a Base Station (BS) in a wireless communication system, the method comprising:
confirming a distance between the BS and at least one of a Relay Station (RS) and a Mobile Stations (MSs) by using position information of the RS or the MSs;
dividing into a link affected by interference of a neighbor cell and a link causing interference to a neighbor cell according to the distance of the RS and the MSs;
allocating the link affected by the interference of the neighbor cell and the link causing the interference to the neighbor cell to different frequency bands; and
communicating with the RS or the MS according to the allocated resource information.

13. The resource allocating method of claim 12, further comprising: transmitting the resource allocation information to the RS and the MS.

14. The resource allocating method of claim 12, wherein the allocating of the links comprises:
allocating the link affected by the interference of the neighbor cell to a first frequency band;
allocating the link causing the interference to the neighbor cell to a second frequency band; and
allocating a link not affected by the interference of the neighbor cell to the first frequency band or the second frequency band.

15. The resource allocating method of claim 12, wherein the position information comprises at least one of Global Positioning System (GPS) coordinates, a strength of a receive signal, and a Signal to Interference and Noise Ratio (SINR) of the RS or the MSs.

16. A communicating method of a Relay Station (RS) in a wireless communication system, the method comprising:
confirming and sending position information to a serving Base Station (BS);
when resource allocation information is received from the serving BS, confirming a frequency resource allocated to a link to the BS or a Mobile Station (MS) based on the resource allocation information; and
communicating with the BS or the MS such that a link affected by interference of a neighbor cell uses a first frequency band and a link causing interference to the neighbor cell uses a second frequency band according to the allocated frequency resource.

17. The communicating method of claim 16, further comprising: communicating such that a link not affected by the interference of the neighbor cell uses at least one of the first frequency band and the second frequency band according to the allocated frequency resource.

18. The communicating method of claim 16, wherein the position information comprises at least one of Global Positioning System (GPS) coordinates, a strength of a receive signal, and a Signal to Interference and Noise Ratio (SINR).

19. A communicating method of a Mobile Station (MS) in a wireless communication system, the method comprising:
confirming and sending position information to a Base Station (BS);
when resource allocation information is received from the BS, confirming a frequency resource allocated to a link to at least one of the BS and a Relay Station (RS) based on the resource allocation information; and
communicating with the at least one of the BS and the RS such that a link affected by interference of a neighbor cell uses a first frequency band and a link causing interference to the neighbor cell uses a second frequency band according to the allocated frequency resource.

20. The communicating method of claim 19, further comprising: communicating such that a link not affected by the interference of the neighbor cell uses one of the first frequency band and the second frequency band according to the allocated frequency resource.

21. The communicating method of claim 19, wherein the position information comprises at least one of Global Positioning System (GPS) coordinates, a strength of a receive signal, and a Signal to Interference and Noise Ratio (SINR).

22. A Base Station (BS) in a wireless communication system, the BS comprising:
a receiver for receiving position information from at least one of a Relay Station (RS) and Mobile Stations (MSs);

a position information confirmer for confirming a distance between the BS and the RS or the MSs based on the received position information; and a resource allocator for allocating a link affected by interference of a neighbor cell and a link causing interference to the neighbor cell to different frequency bands according to the distance information.

23. The BS of claim 22, wherein the position information confirmer confirms the distance to the at least one of the RS and the MSs by using at least one of Global Positioning System (GPS) coordinates, a strength of a receive signal, and a Signal to Interference and Noise Ratio (SINR) of the RS or the MS.

24. The BS of claim 22, wherein the resource allocator allocates the link affected by the interference of the neighbor cell to a first frequency band, the link causing the interference to the neighbor cell to a second frequency band, and a link not affected by the interference of the neighbor cell to the first frequency band or the second frequency band.

25. The BS of claim 22, further comprising:

a sender for transmitting the resource allocation information to the RS and the MSs.

* * * * *